United States Patent [19]
Guillaud

[11] 3,873,669
[45] Mar. 25, 1975

[54] PROCESS FOR TREATMENT OF VANADIUM CONTAINING FLY ASH

[76] Inventor: Philippe Guillaud, le Giffre-Marignier, Bonneville, France

[22] Filed: June 8, 1973

[21] Appl. No.: 368,053

[30] Foreign Application Priority Data
June 9, 1972 France .............................. 72.20907

[52] U.S. Cl...................... 423/65, 423/68, 423/331
[51] Int. Cl............................................. C01g 31/00
[58] Field of Search .................... 423/62, 66, 68, 65

[56] References Cited
UNITED STATES PATENTS
1,563,061  11/1925  Baldeschwieler.................... 423/64
3,416,882  12/1968  Whigham.......................... 423/64 X
3,712,942  1/1973  Suejda.............................. 423/68 X Primary Examiner—Herbert T. Carter

[57] ABSTRACT

The invention is addressed to the recovery of vanadium by the treatment of fly ash derived from bituminous or petroleum products, such as bituminous schists. In accordance with the practice of this invention, the fly ash is treated with a concentrated caustic soda solution selectively to solubilize vanadium, and in adding calcium oxide to the reacting solution in an amount within the range of 6–40 percent of the silica contained in the ash, with the addition being made preferably during the latter portion of the treatment.

8 Claims, 3 Drawing Figures

PROCESS FOR TREATMENT OF VANADIUM CONTAINING FLY ASH

The present invention relates to a process for treatment of fly ash derived from bituminous or petroleum products for the purpose of solubilizing the vanadium present as a vanadate.

The ash contains 20–70 percent free carbon with the remainder comprising mineral matter composed mainly of silica and alumina and up to 15 percent by weight $V_2O_5$.

The raw material, for which the process of this invention has been devised, is formed of fly ash produced by the combustion of coke prepared from bituminous schists, a typical analysis of which is as follows (% by weight): 2% $V_2O_5$, 20% $SiO_2$, 10% $Al_2O_3$, 4% $Fe_2O_3$, 3% CaO, 1% $TiO_2$, 1 to 2% MgO + $Na_2O$ + $K_2O$, the remainder being essentially free carbon. However, the process can also be used with all kinds of fly ash produced by the combustion of petroleum products or coke derived from vanadium containing petroleum products, for which known processes have not been found to be suitable.

The process most commonly used, for recuperating vanadium from minerals, consists in treating the later with sulphuric acid. This type of treatment is described in Canadian Patent No. 770,058; however, it is not suitable for the treatment of ash containing small amounts of vanadium because, on the one hand, of the high consumption of reactants which react with the oxides and, on the other hand, the difficulty of later separating vanadium from the dissolved salts of iron and aluminum.

Roasting in the presence of a salt of sodium can be used in certain cases; however, it is a costly operation which is applicable only to ash having high vanadium content. The operating conditions, in this case, are very complicated since the roasting temperature must be kept within a very narrow range.

Attack by a solution of sodium hydroxide, either after calcination in the presence of a sodium salt (Russian Patent No. 172,044), or on the crude ore (U.S. Pat. No. 1,563,061), could be considered. Such process is applicable only to usual ores rich in vanadium and poor in silica and alumina, since both of these substances go into solution together with vanadium and subsequent separation is difficult.

It has been proposed (in German patent application No. 1,767,408) to effect reaction with milk of lime which first precipitates calcium aluminate and calcium silicate, then cooling after filtering to crystalize an alkaline vanadate. Such a process is long and expensive in view of the various successive filtrations. Furthermore, it is somewhat selective: a portion of the vanadium is carried off with the calcium aluminates and calcium silicates and the alkaline vanadate obtained is impure and difficult to purify.

If the $V_2O_5/SiO_2$ weight ratio in the raw material is about 0.1, it is possible to obtain a concentrated solution which contains more vanadium than silica, in the fraction which is dissolved, only if the rate of solubilization of vanadium is more than ten times greater than that of silica. The alkaline treatment of raw materials of this type is difficult because one must, at the same time, obtain an extremely high rate of solubilization of vanadium and a very low rate of solubilization of silica.

The present invention is based upon the observation that if the free ash is treated with a caustic soda solution containing 1 to 5 moles $Na_2O$/liter, vanadium is much more easily solubilized than silica, alumina, and the other impurities. It has futhermore been observed that the solubilization is selective in practice. This was wholly unexpected by the skilled in the art.

For example, when free ash containg 2% $V_2O_5$, 18% $SiO_2$, 10% $Al_2O_3$, 4% $Fe_2O_3$ and 60% carbon are treated at 90°C with a 2.5 M solution of NaOH, after 6 hours, 85 percent vanadium and only 7 percent silicon have been solubilized, while treatment of classical types of minerals, vanadium and silicon were solubilized in substantially equal percentages.

In order to try to provide an explanation for this unexpected behavior, tests were made under the electronic microscope. These tests have shown that the particles of ash, which are usually in the form of hollow or solid balls of about 10 microns diameter, possess a vitreous aspect and, after reaction with caustic soda, have an engraved aspect without noticeable variation in form and dimension. It is therefore believed, and this is submitted as a non-limiting hypothesis, that vanadium is not dispersed throughout the whole vitreous mass within the particles, but rather it is located in selective sites which are more accessible.

The process of this invention consists in combining an attack of the ash with aqueous solution of sodium hydroxide, under certain conditions of concentration, temperature and time, with an addition of lime in a weight proportion of 6–40 percent of the weight of silica contained in the ash, i.e. a quantity wholly insufficient to effect total neutralization.

The ideal industrial conditions are not necessarily those which lead to a higher $V_2O_5/SiO_2$ ratio in the dissolved phase, since one must also take into consideration the caustic soda consumption and, above all, the absolute rate and amount of solubilization of vanadium, all of which are very important factors in determining the cost of the vanadium concentrate. However, it has been observed that with concentrations over 5 moles $Na_2O$ per liter, the suspension remains undesirably viscous and difficult to use. With concentrations less than 1 mole per liter, solubilization of vanadium is unsatisfactory, even after considerable periods of time. It is desirable to operate with concentrations within the range of 3 to 5 moles $Na_2O$/liter, by the "paste" technique, i.e. with a high solid/ liquid ratio to give a suspension of pasty consistency. In this manner, it is possible to realize important savings of caustic soda, especially if this material is expensive. It is, however, preferable to operate in a liquid phase and with a concentration of 1 to 2 moles $Na_2$ O per liter. In this manner, the process is more easily put into operation. Concentrations above 2 moles per liter provide for a more substantial solubilization of silica without a comparable increase with respect to vanadium. The solid/liquid ratio should be as high as possible with the required quantities of caustic soda while, at the same time, enabling a fluid mixture to be obtained in spite of the eventual presence of a large quantity of carbonaceous material which absorbs a lot of water. A preliminary treatment, such as light roasting, and/or flotation, can also be carried out in order to eliminate residual carbon, without being prejudicial to the operation of the process of this invention.

The total quanity of $Na_2O$ which should be used is usually about 25 to 40 kg per 100 kg of mineral material present in the ash and 20 to 30 kg for the paste technique. The temperature at which the attack is carried out should be above 50°C., perferably between 80°C and the boiling point. At lower temperatures, the attack does not progress rapidly and it is practically non-existent at room temperature.

The attack, carried out under the conditions indicated above, is continued for 4 to 8 hours. It can be achieved more rapidly with highly concentrated solutions. After 8 hours, little, if any, more $V_2O_5$ is dissolved.

The addition of line to the reaction solution materially reduces stabilization of silica and alumina, duet to the formation of silicate and insoluble calcium silicoaluminate. It would appear logical to assume that there would be a simultaneous formation of insoluble calcium vanadate which would considerably decrease the solubilization rate of vanadium. This does occur when the addition of lime is employed without resorting to the special measures outlined hereinbelow.

A study was made of the influence of the addition of increasing quantities of lime to the caustic soda solution at the start of the reaction. In a test corresponding to the ash used in Example 1 (hereinafter described), table I shows the variation in rate of solubility of vanadium and silicon and the consumption of caustic soda as a function of the concentration of lime, expressed as CaO. The last column, in the following tabe, illustrates the weight ratio of $V_2O_5/SiO_2$ in the solution after reaction, starting with a weight ratio of 0.1 in the raw material.

of a quantity of calcium oxide within the range of 6–40 percent of the weight of silica contained in the ash.

This is not the quantity which corresponds to the maximum $V_2O_5/SiO_2$ ratio in the solution. The latter would be in the vincinity of 8.3 for about 380 kg lime per ton of silica. In such instance, the loss of vanadium would be high.

by studying the kinetics of the precipitation phenomenon of vanadium and silicon, resulting from the treatment with lime, in a solution obtained by treating a caustic soda solution without lime, it has been unexpectedly found that the precipitation of the silicate, at equilibrium, was reached much more rapidly than that of the vanadate.

In the drawings, which are submitted by way of illustration, but not by way of limitation, of the practice of this invention:

Figure 1:
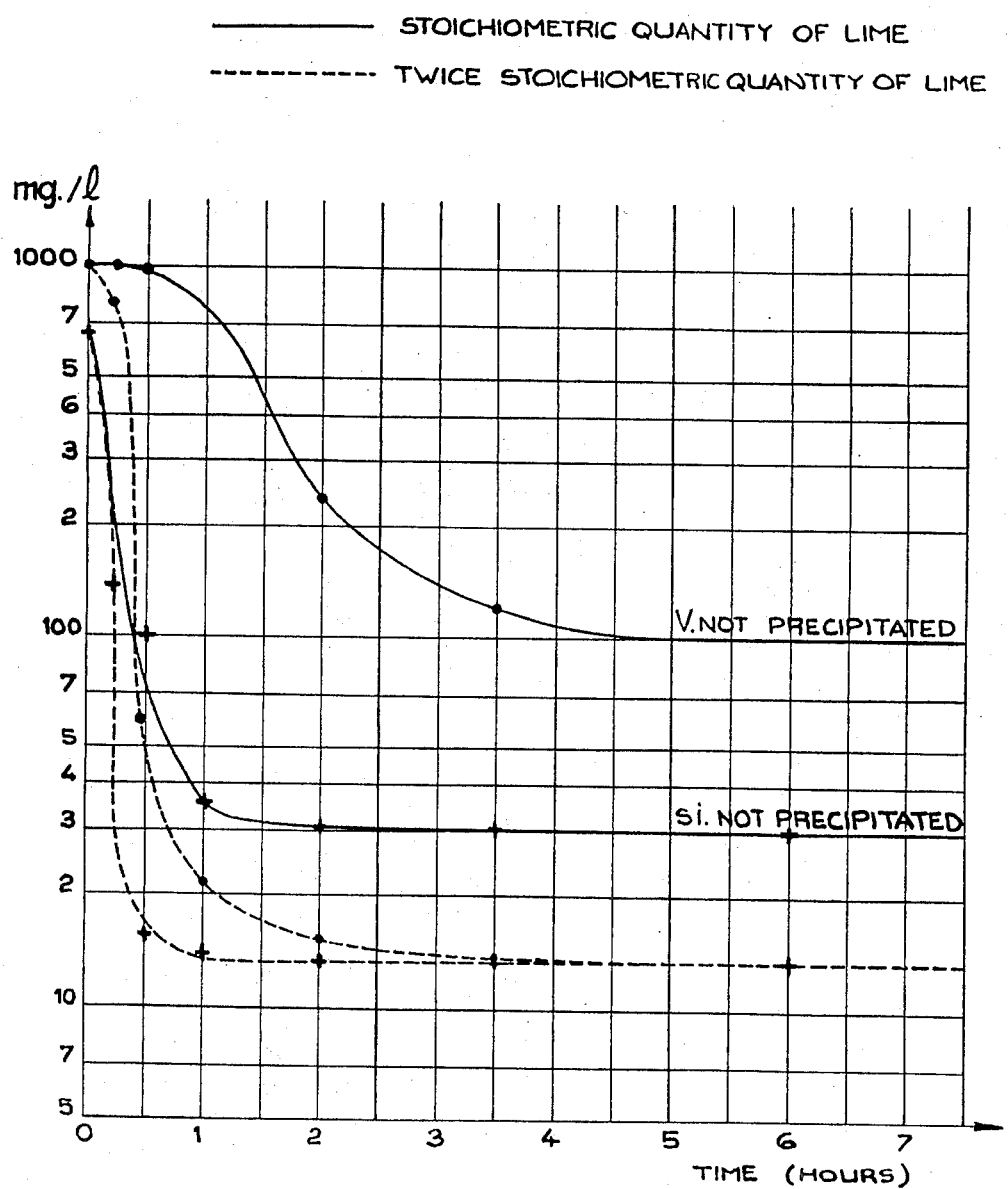
FIG. 1 shows curves relating pprecipitation of vanadium and silica compounds as a function of time in a solution containing 1,000 mg/l V and 650 mg/l Si (a) in the presence of a stoichiometric amount of lime, and (b) in the presence of twice that amount.

The precipitation of calcium silicates occurs very rapidly even at the start of the lime addition, while precipitation of the vanadate starts only after a substantial

TABLE I

| Quantity of lime CaO expressed in Kg/t of silica contained in the ashes, added as a whole at the start of the reaction | $V_2O_5$ solubilized in % of $V_2O_5$ in ashes | $SiO_2$ solubilized in % of $SiO_2$ in ashes | Consumption Kg $Na_2O$/t | $\dfrac{V_2O_5}{SiO_2}$ solubilized |
|---|---|---|---|---|
| 0 | 84 | 7.5 | 54 | 1.2 |
| 60 | 82 | 5.3 | 43 | 1.7 |
| 130 | 82 | 4.0 | 40 | 2.3 |
| 180 | 80 | 4.2 | 39 | 2.1 |
| 230 | 80 | 3.7 | 38 | 2.3 |
| 310 | 80 | 2.6 | 37 | 3.7 |
| 380 | 77 | 1.0 | 37 | 8.3 |
| 460 | 72 | 1.3 | 35 | 6.1 |
| 620 | 65 | 1.2 | 35 | 5.7 |

It will be seen that the results are markedly improved by adding more than 60 kg of lime per ton of silica.

The quantity of solubilized vanadium decreases much less rapidly than the quantity of solubilized silica when the quantity of lime is progressively increased up to about 400 kg per ton of silica. Beyond this amount, vanadium becomes increasingly insoluble.

It is to be noticed that such amounts are considerably less than that necessary to form calcium silicate with all of the silica present. For instance, 930 kg of lime per ton of silica would be necessary to obtain $CaSiO_3$.

The optimum economic efficiency from the lime addition to the reacting solution is in the vicinity of about 300 kg of CaO per ton of silica, in view of the resulting economy of caustic soda as well as the possible rate of solubilization of vanadium. It is preferred to make use period of time, such as 30 to 60 minutes in the first case with a stoichiometric amount of lime, and about 15 minutes in the second case with twice that amount.

Modifications can be made to the process for additional lime in order to obtain a high ratio of $V_2O_5/SiO_2$ in the solution without increasing the vanadium losses.

This modification consists in adding lime, not all at once in the solution of caustic soda at the start of the reaction, but either progressively during the reaction or preferably all at once toward the end of the reaction, such as 15 to 30 minutes before filtering the mixture. The latter procedure is easier in a treating apparatus in continuous operation. The following Table II shows the results which are obtained by adding various charges of lime in the suspension after 5 hours and 30 minutes of reaction which is terminated 30 minutes later.

TABLE II

| lime added 30 mn before filtration, in kg for 1 t of silica contained in the ashes | $V_2O_5$ solubilized in % of $V_2O_5$ in ashes | $SiO_2$ solubilized in % in of $SiO_2$ in ashes | Consumption of caustic soda kg $Na_2O/t$ | $\dfrac{V_2O_5}{SiO_2}$ solubilized |
|---|---|---|---|---|
| 0   | 84 | 7.5 | 54 | 1.2 |
| 230 | 82 | 0.9 | 42 | 9.8 |
| 380 | 66 | 0.7 | 40 | 10.3 |
| 550 | 62 | 0.5 | 40 | 13.5 |

It will be seen that, under these conditions, the addition of 230 kg of lime per ton of silica has not only decreased the rate of solubilization of vanadium by 2 percent, but has decreased that of silica by 88 percent. The weight ratio $V_2O_5/SiO_2$ in the solution is in the vicinity of 10. The caustic soda consumption corresponds to 42 kg per ton of treated ash.

Higher quantities of lime produce a slight increase of the ratio $V_2O_5/SiO_2$ in the solution, but lead to such large decrease in the rate of extraction of the vanadium oxide as to be economical under actual conditions. Preferably, the quantity of calcium oxide should comprise between 20 and 25 percent of the weight of silica contained in the ash.

It is therefore possible to start the reaction with a solution of caustic soda alone, then, after filtration, treat the liquid phase with lime in order to precipitate the major portion of silica, without insolubilizing a substantial portion of vanadium. Thereafter, calcium silicate is separated by filtration. Calcium vanadate is then precipitated by using excess lime for an extended period of time. The precipitate can be treated for example in known manner with carbon dioxide and ammonia in order to precipitate ammonium vanadate.

However, this mode of operation produces an excessive consumption of caustic soda as a result of the formation of insoluble sodium silico-aluminates. Furthermore, the presence of two filtration steps used in succession is complicated and undesirable. According to a preferred mode of operation of the process according to the invention, lime is caused to act directly on the product which is reacted with caustic soda, before filtration. For this purpose, the entire suspension, obtained by reaction with caustic soda, is treated while hot with a milk lime containing 0.2 to 0.3 mole of CaO per mole of silica present in the treated ash. In this manner, the sodium silico-aluminates are partially replaced by calcium silico-aluminates and nearly all the sodium silicate is precipitated in the form of calcium silicate. 20 to 30 minutes after the addition of lime, the suspension is filtered while the sodium vanadate has not started to react with lime.

The filtered solution contains as much vanadium, but much more sodium and much less silica than the filtered solution after reaction with the caustic soda alone, without treatment with lime.

In a continuous industrial process, the reaction is carried out in a series of reactors: the first reactors receive the ash and the solution of caustic soda alone, which is present therein, while stirring during an average of 5 to 6 hours at 80° to 90°C. before transfer to the last reactor. It is in the last reactor that lime is added as milk lime. The suspension resides therein for an average of 30 minutes, after which it is filtered. Before removing the residue, the latter is washed thoroughly in order to displace the solution which is strongly held by the carbon.

The filtrate, combined with the wash water, consists of an aqueous solution which contains some vanadate, some sodium silicate and free caustic soda. Since the solution is too diluted to be recycled, it is concentrated to a third of its volume, as by evaporation.

The solution is then treated by processes known pe se in order to precipitate the vanadium and to recover the caustic soda. The calcium salts ($V_2O_5$, 4CaO) and ($CaSiO_3$) are precipitated by adding excess lime in order to increase the speed and the rate of precipitation of the basic calcium vanadate. It is believed to be undesirable to allow too much increase in the vanadium concentration of the solutions which are recycled. The precipitation lasts about 2 hours at 90°C in the presence of a quantity of lime which is double the stoichiometric quantity and produces an impure product which cannot generally be used in this form.

In order to separate the pure oxide, the precipitate is suspended in a known manner in an aqueous solution of sodium bicarbonate and treated by bubbling carbon dioxide to cause a precipitation of calcium carbonate $CaCO_3$ and of the residual silica. After filtration, washing and concentration of he filtrate, as by evaporation, vanadium is allowed to precipitate without heating in the form of ammonium metavanadate, by introducing ammonia and carbon dioxide. The precipitate is separated from the filtrate, which is recycled for carbonate formation, and is thereafter decomposed under heat to recover ammonia, which is recycled, and vanadium oxide.

As an example, the treatment was carried out with fly ash resulting from the combustion of coke derived from the treatment of bituminous schists and containing, by weight, per 100 kg of ash:

| | |
|---|---|
| $SiO_2$ | 180 |
| $Al_2O_3$ | 103 |
| $Fe_2O_3$ | 37 |
| CaO | 26.3 |
| $V_2O_5$ | 19.5 |
| $TiO_2$ | 10.7 |
| $MgO + Na_2O + K_2O$ | 15 |
| Various other oxides | 3.5 |
| Carbon | 605 |

A portion of ash was treated according to the prior art by attack with sodium hydroxide alone. Another identical portion was treated according to the present invention, by attack with sodium hydroxide with an addition of lime.

The amounts mentioned hereinafter refer to 1,000 kg of ash but it will be understood that the treatments are continuous.

EXAMPLE 1

Figure 2:
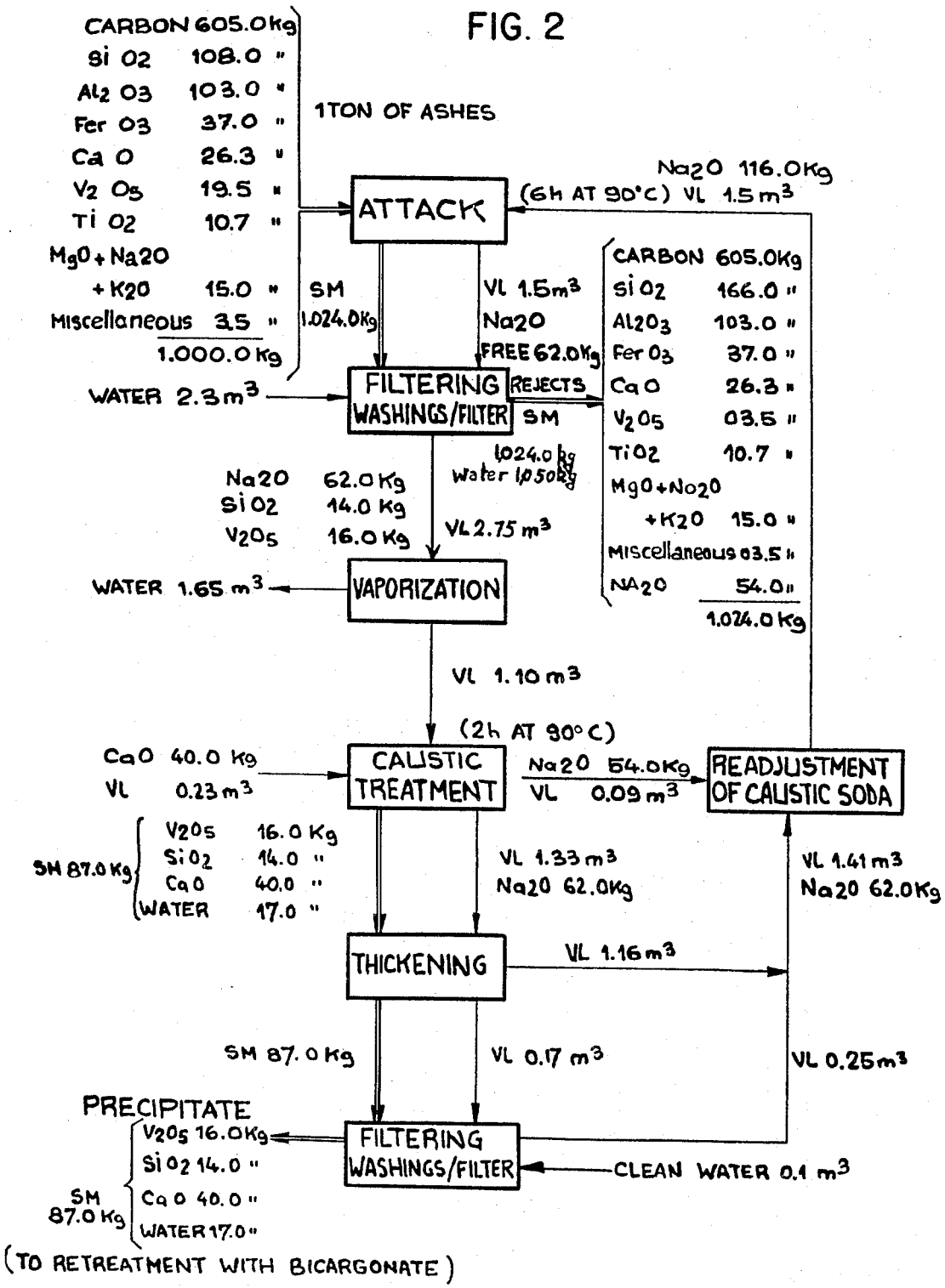
FIG. 2 is a flow diagram for treatment of fly ash in accordance with the process described in part 1 of Example 1.

Portion No. 1 (FIG. 2)

The reaction, with a liquor containing 116 kg $Na_2O$ in solution in 1.5 cubic meter of water, lasts an average of 6 hours at 90°C. The suspension, from the reactor, is passed over a filter and the residue is washed with 2.3 $m^3$ of water.

The residue, consisting of 1024 kg, contains all the alumina, carbon, iron, titanium, magnesium, calcium and alkaline salts which were present in the ash, together with 166 kg of silica and 3.5 kg of $V_2O_5$. The filtrate contains in solution 62 kg $Na_2O$, 14 kg $SiO_2$ and 16 kg $V_2O_5$. 82 percent of the vanadium and 7.8 percent of the silica have therefore been solubilized.

The volume of the filtrate is then reduced form 2.75 $m^3$ to 1.10 $m^3$ by evaporation. Then the caustic treatment is carried out with a milk of lime containing 40 kg of CaO in 0.23 $m^3$ of water for 2 hours at 90°C. A solution of caustic soda is thereafter separated by decanting, after which the residue is filtered and washed with 0.1 $m^3$ of water. The filtrate combined with the washing water and the decanted solution of caustic soda adds up to 1.41 $m^3$ of a solution of caustic soda containing 62 kg $Na_2O$. To this solution, there are added 90 l of a concentrated solution containing 54 kg of $Na_2O$ to form the reacting liquor. The precipitate contains 16 kg $V_2O_5$, 14 kg $SiO_2$, 40 kg CaO, 17 kg water, or in dry condition, 22.8 percent of oxide: $V_2O_5$.

It is then put into suspension in a solution containing 35 kg of sodium bicarbonate in 0.15 $m^3$ water, and 35 kg of carbon dioxide are thereafter bubbled through this suspension, which is then filtered. Calcium carbonate and calcium silicate separate on the filter, while vanadium remains in the filtrate. Precipitation is carried out by bubbling through the solution 4 kg $NH_3$ and 8 kg of $CO_2$ for 10 kg of $V_2O_5$. The solution is then filtered. The filtrate is a solution of sodium carbonate which is recycled after concentration by evaporation. The residue comprises pure ammonium vanadate which is decomposed under heat. Ammonia is recycled and 15.2 kg of vanadium oxide containing about 96% $V_2O_5$ are recovered.

Figure 3:
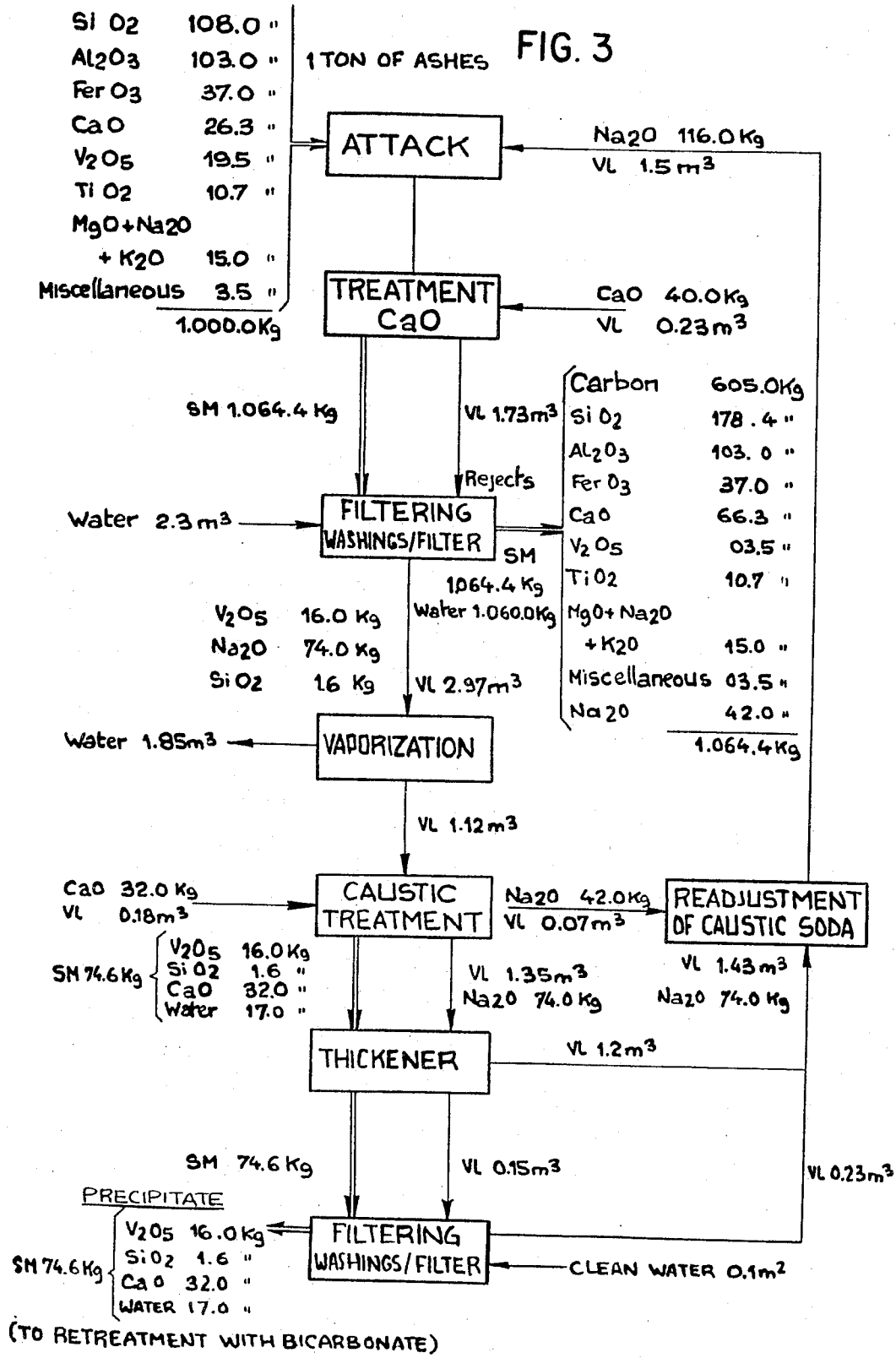
FIG. 3 is a flow diagram of the treatment described in part 2 of Example 1.

Portion No. 2 (FIG. 3)

The reaction in the first reactors is carried out with 116 kg of $Na_2O$ in solution in 1.5 $m^3$ water for an average of 5 hours 30 minutes at 90°C and is terminated in the last reactor where a milk lime is introduced containing 40 kg of CaO in 0.23 $m^3$ of water with suspension for 30 minutes. At the exit, the suspension is passed through a filter and the residue is washed with 2.3 $m^3$ water. This residue, comprising 1,064.4 kg, contains all the alumina, iron, titanium, carbon, magnesium and alkaline salts which were present in the mineral. The silica content is 178.4 kg, lime 66.3 kg, $V_2O_5$ kg and the quantity of insolubilized caustic soda $Na_2O$ is 42 kg. The filtrate contains in solution $V_2O_5$: 16 kg, $SiO_2$: 1.6 kg, $Na_2O$: 74 kg. 82 percent of the vanadium and 0.9 percent of the silica have therefore been solubilized.

The volume of the filtrate is reduced from 2.97 $m^3$ to 1.12 $m^3$ by vaporization, then the caustic treatment is carried out with a milk lime containing 32 kg of CaO in 0.18 $m^3$ of water for 2 hours at 90°C. A solution of caustic soda is then separated by decanting, the residue is filtered and washed over a filter with 0.1 $m^3$ of water. The filtrate, combined to the washing water, is added to the solution of caustic soda which has been decanted. The whole comprises 1.43 $m^3$ of a solution of caustic soda containing 74 kg of $Na_2O$, to which are added 70 liters of a concentrated solution containing 42 kg of $Na_2O$, to compensate for the quantity of caustic soda which has been rendered insoluble during the reaction. This solution is recycled to the first reactor.

The precipitate contains, in a dry state, 16 kg $V_2O_5$, 1.6 kg $SiO_2$ 32 kg CaO, i.e. 32.3% $V_2O_5$. It is treated like portion 1, and 15.6 kg vanadium oxide containing 98% $V_2O_5$ are finally obtained.

It is to be noted that improvements in the quantity of $V_2O_5$ recovered as well as in its purity have been made.

Moreover, only 42 kg $Na_2O$ and 72 kg CaO have been consumed, instead of 54 kg NaO and 40 kg Cao for the process of portion No. 1.

As the price of $Na_2O$ is usually about five times higher than the price of CaO, an appreciable amount of savings is achieved.

I claim:

1. A process for the treatment of fly ash derived from petroleum of bituminous products to recover vanadium oxide present in the ash by the formation of a soluble vanadate, comprising reacting the ash with a solution of caustic soda containing 1 to 5 moles of $Na_2O$ per liter for the period within the range of 4–8 hours and a temperature within the range of between 50°C and the boiling temperature of the solution, adding calcium oxide to the reacting solution in an amount within the range of 6–40 percent of the weight of the silica contained in the ash to precipitate silica in the form of a calcium salt, and recovering vanadium values.

2. The process as claimed in claim 1 in which the caustic soda solution contains 1 to 2 moles of $Na_2O$ per liter and the reaction is carried out at a temperature within the range of 80°C to the boiling point.

3. The process as claimed in claim 1 in which the addition of lime is made immediately prior to the end of the reaction in order to prevent precipitation of excessive amounts of calcium vanadate.

4. The process as claimed in claim 1 in which the amount of calcium oxide added is within the range of 20–25 percent by weight of the silica contained in the ash.

5. The process as claimed in claim 1 which includes the step of mild roasting and flotation of the fly ash to remove residual carbon.

6. The process as claimed in claim 1 in which the reaction is a continuous reaction carried out in one or more reactors which receive the ash and the solution of caustic soda and which includes the step of filtering the suspension formed by the reaction of the ash with the caustic soda.

7. The process as claimed in claim 6 in which the lime is added to the suspension in the last of the reactors.

8. The process as claimed in claim 1 wherein the slurry formed by the reaction of the soda with the ash is filtered, and calcium oxide is added to the filtrate.

* * * * *